Feb. 15, 1949.  J. R. CRAWFORD  2,461,589
PORTABLE POWER-DRIVEN TREE FELLING CIRCULAR SAWS
Filed Nov. 13, 1944  4 Sheets-Sheet 1.
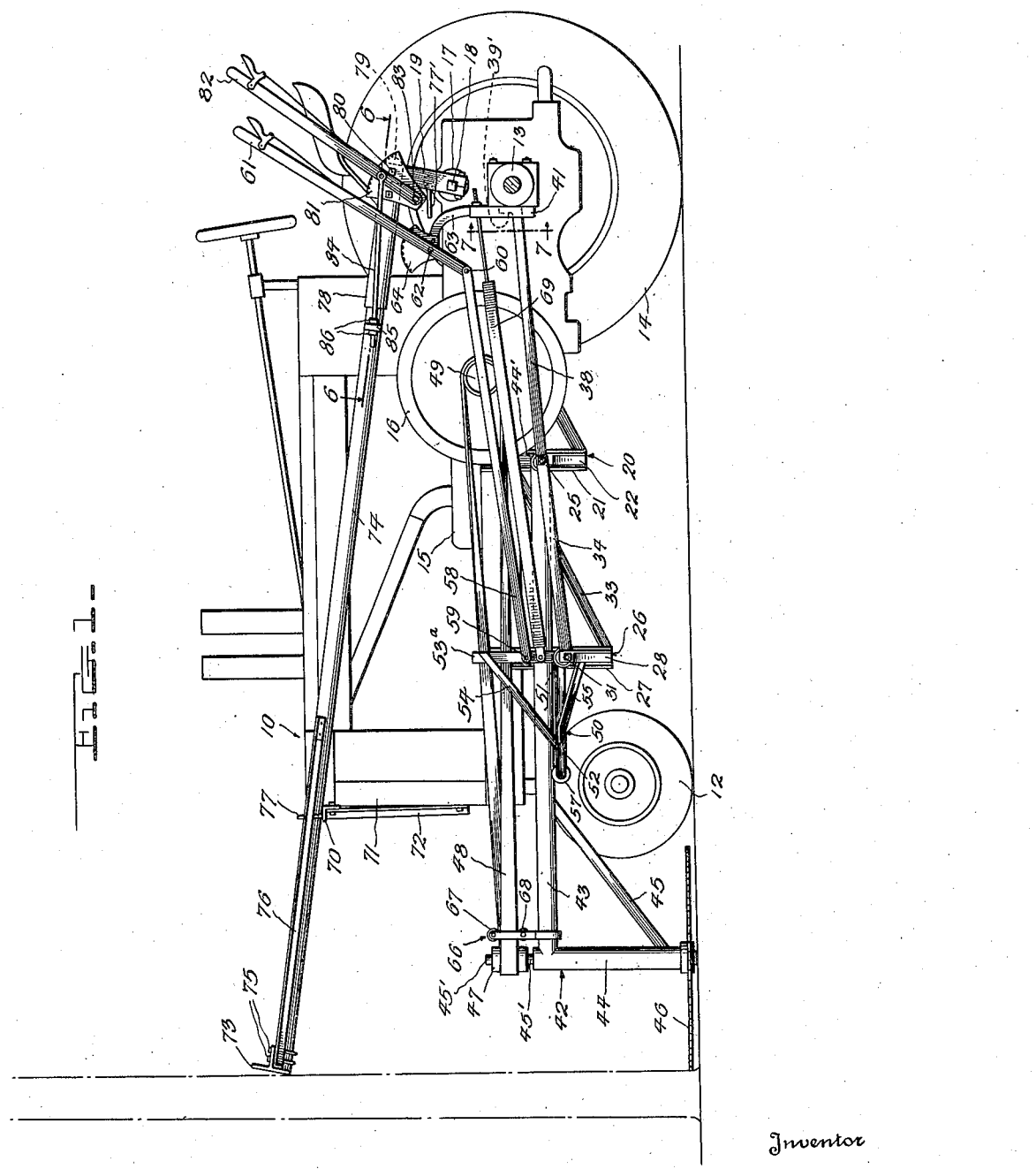
Inventor
J. R. Crawford.
By
Attorney

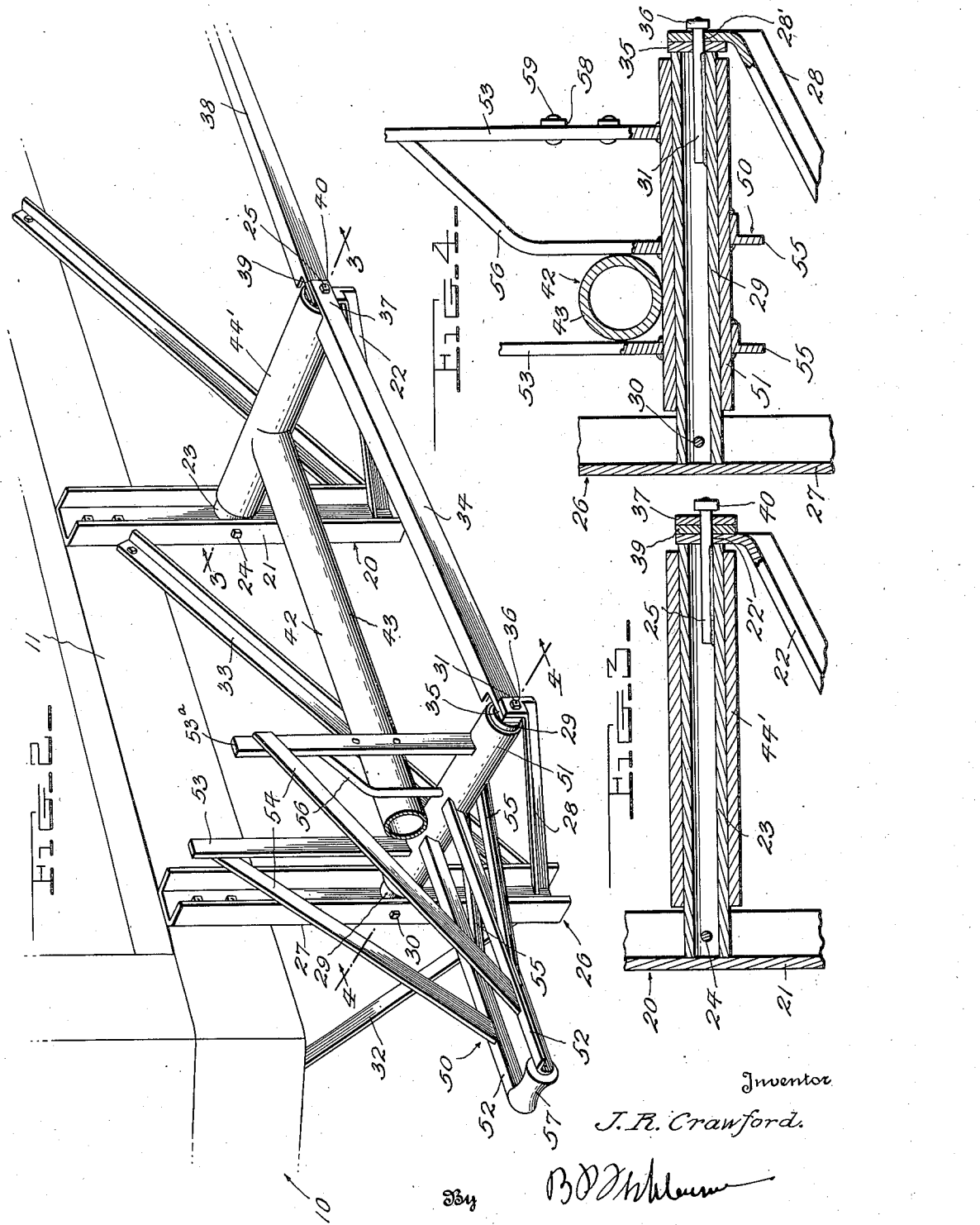

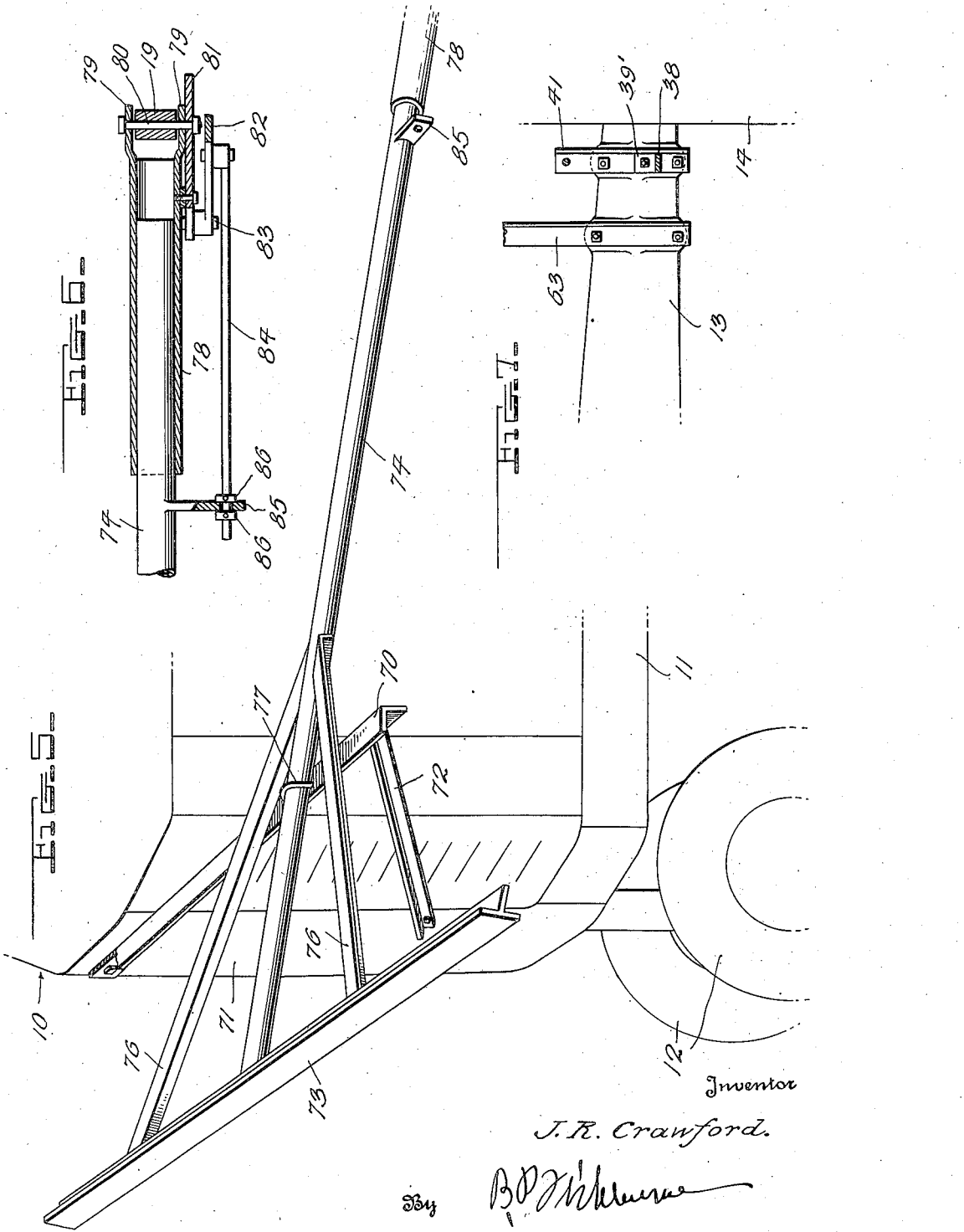

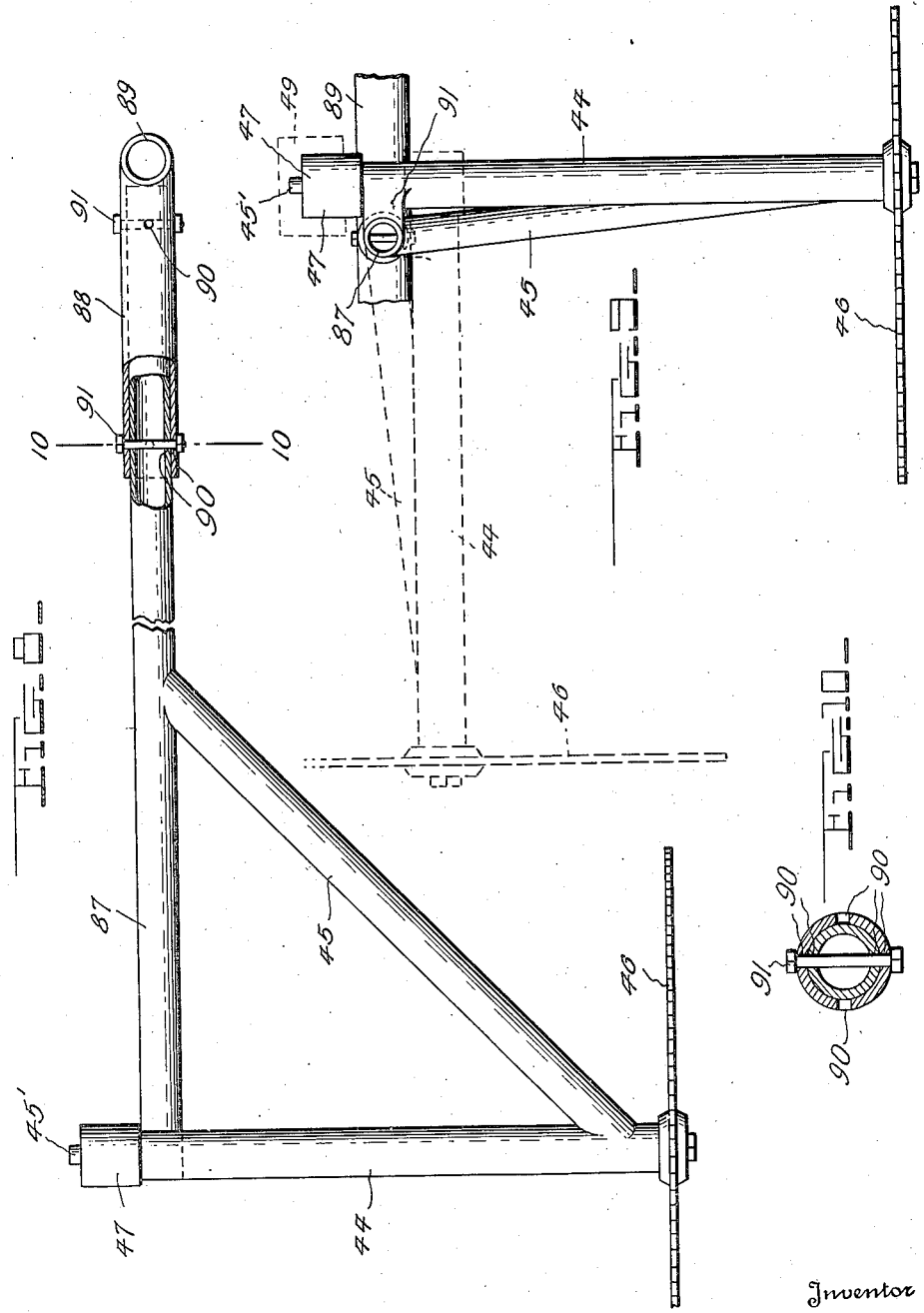

Patented Feb. 15, 1949

2,461,589

UNITED STATES PATENT OFFICE 2,461,589

PORTABLE POWER-DRIVEN TREE FELLING CIRCULAR SAW

James R. Crawford, Clinton, S. C.

Application November 13, 1944, Serial No. 563,238

4 Claims. (Cl. 143—43)

My invention relates to portable power driven saws.

An important object of the invention is to provide a saw of the above mentioned character adapted for use in cutting standing trees.

A further object of the invention is to provide means to exert a pushing force upon the tree, in a direction from the saw, during the cutting action whereby the tree will fall clear of the saw.

A further object of the invention is to provide pushing mechanism for use in connection with the saw, the pushing mechanism being rigid to bend the tree when the tree is sufficiently small or flexible, or being yieldable to permit of the saw partly cutting the tree and subsequently becoming rigid to bend the partly cut tree.

A further object of the invention is to provide apparatus of the above mentioned character which is designed to be made in the nature of an attachment to be installed upon a tractor.

A further object of the invention is to provide apparatus of the above mentioned character, embodying a rotatable saw arranged near the front end of the tractor so that the operator of the tractor may conveniently move the saw into engagement with the standing tree.

A further object of the invention is to provide means for driving the rotary saw directly from the flywheel or crank shaft of the engine of the tractor so that the saw is driven at a constant speed, regardless of the shifting of gears in the starting or stopping of the tractor.

A further object of the invention is to mount the pusher device upon the hydraulic lift of the tractor, whereby the pusher device may yield while the saw is cutting a part of the upstanding tree, when desired.

Other objects and advantages of the invention will be apparent during the course of the following description.

In the accompanying drawings forming a part of this application and in which like numerals are employed to designate like parts throughout the same, Figure 1 is a side elevation of apparatus embodying my invention, showing the same applied to a John Deere tractor, Figure 2 is a perspective view of the supporting frame attached to the chassis of the tractor, Figure 3 is a transverse vertical section taken on line 3—3 of Figure 2, Figure 4 is a similar view taken on line 4—4 of Figure 2, Figure 5 is a perspective view of the pusher element and associated elements, Figure 6 is a horizontal section taken on line 6—6 of Figure 1, Figure 7 is a vertical section on line 7—7 of Figure 1, Figure 8 is a plan view of a modified form of saw carrying boom, Figure 9 is an end elevation of the same, and Figure 10 is a transverse section taken on line 10—10 of Figure 8.

In the drawings, wherein for the purpose of illustration is shown a preferred embodiment of my invention, the numeral 10 designates a tractor as a whole such as a John Deere tractor. This tractor includes a chassis having horizontal side rails 11. At the front of the chassis are the usual steering wheels 12. The crank case is connected with the rear end of the chassis 10 and the rear axle housing 13 is connected with this crank case. The numeral 14 designates traction wheels. The engine 15 is suitably mounted upon the chassis 11 and includes an exterior flywheel 16, directly mounted upon the crank shaft which extends transversely of the chassis. The tractor is also provided with a hydraulic lift, including a transverse housing 17, in which is rotatably mounted a transverse horizontal shaft 18, the ends of which are formed square and have arms mounted thereon. These arms are employed to raise and lower integral tractor equipment such as cultivators, plows, planters or the like. In connection with the present invention I use only one of these arms 19 which I have shown mounted upon one end of the shaft 18 and this arm is arranged upon the shaft to be generally vertical and extend above the shaft when the arm is in the forward position. This arm is associated with the pusher device, as will be more fully described. The hydraulic lift is shown in Patents 2,917,848 and 2,342,306.

A supporting frame is arranged upon one side of the rail 11 and is attached thereto. This frame includes a generally V-shaped bracket 20, comprising an inner vertical side 21 and an outer diagonal side 22. These sides may be formed of a channel iron and an angle iron. The vertical side 21 is rigidly secured to the rail 11 by bolts or the like.

The numeral 23 designates a horizontal tubular pivot, the inner end of which is arranged within the vertical channel arm 21 and is connected therewith by a bolt 24. The opposite end of the tubular pivot 23 has a bolt 25 extending into the same and welded therein. See Fig. 3. The bolt 25 extends through an opening in the diagonal angle arm 22 and projects to the outer side of the arm 22, for a purpose to be described. The numeral 26 designates a companion bracket including an inner vertical arm 27, preferably in the form of a channel and an outer diagonal arm 28, preferably in the form of an angle iron. These two arms are rigidly secured together at their lower ends by welding or the like. A tubular pivot 29 is horizontally arranged and has one end projecting into the channel arm 27 and is secured thereto by a bolt 30. A bolt 31 extends into the opposite end of the tubular pivot 29 and is welded therein and extends through an opening formed in the angle arm 28 and extends beyond this angle arm. See Fig. 4. A companion transverse diagonal arm 32, which may be an angle iron is rigidly secured to the lower end of the arm 27 and extends to the opposite rail 11 and is rigidly attached thereto. The channel arm 27 is rigidly mounted upon the rail 11 forwardly of the arm 21 and is secured thereto by a bolt. A longitudinal diagonal arm 33, preferably in the form of an angle iron, is rigidly secured at its lower end to the arm 27 and has its upper end attached to the rail 11. The bracket 26 is therefore securely braced against transverse and longitudinal displacement with respect to the chassis 10. A horizontal bar 34, preferably in the form of an angle iron, has an apertured knuckle 35 at its forward end to receive the bolt 31 and is held thereon by a nut 36. The opposite end of the bar 34 has a companion apertured knuckle 37, receiving the bolt 25. The numeral 38 designates a horizontal bar having apertured knuckles 39 and 39', and the forward apertured knuckle 39 receives the bolt 25. Knuckles 37 and 39 are held upon the bolt by a nut 40. The rear apertured knuckle 39' may be bent at a right angle to the bar 38 and is secured to an attaching plate 41, which in turn is secured to a flat upon the axle housing. See Fig. 1.

The numeral 42 designates a vertically adjustable saw carrying support, including a boom 43, which is preferably tubular. At its rear end this boom has a transverse sleeve or tubular head 44' rigidly secured thereto and this sleeve is pivotally mounted upon the tubular pivot 23. The boom 43 is disposed outwardly of and near the rail 11 and extends longitudinally of the same and the forward end of the boom extends beyond the forward end of the tractor. A transverse sleeve 44 is rigidly attached to the forward end of the boom 43 and a diagonal brace 45 also connects these parts. A rotary mandrel or spindle 45' is mounted within the sleeve 44 and is held in place by suitable bearings. A rotary saw 46 is rigidly mounted upon the lower end of the mandrel and a vertical pulley 47 is attached to the upper end of the mandrel, to drive the same. A belt 48 engages the vertical pulley 47 and also engages a horizontal pulley 49, arranged upon the face of the fly wheel 16 and rigidly secured thereto.

Means are provided to raise and lower the boom 43, including a swinging device 50, including a sleeve 51, pivotally mounted upon the tubular pivot 29. This sleeve 51 has horizontal bars 52, rigidly secured thereto by welding or the like, and vertical bars 53, secured to the same by welding or the like. Diagonal top bars 54 connect the bars 52 and 53 and diagonal bottom bars 55 connect the bars 52 and the bottom of the sleeve 51. A spacer bracket 56 is arranged adjacent to one vertical bar 53 and is rigidly attached thereto. The boom 43 is arranged between the spacer bracket 56 and the inner vertical bar 53 and is thereby held against lateral displacement. A grooved roller 57 is mounted between the forward ends of the horizontal bars 52 and suitably connected therewith and is disposed to engage beneath the boom 43. It is thus seen that when the device 50 is swung upwardly upon its pivot 29 that the roller 57 will engage beneath the boom and raise the same. The means to swing the device 51 comprises a link or bar 58, pivoted to the outside vertical bar 53, at 59. This link extends rearwardly and is pivoted at 60 to the lower end of a lever 61, pivoted at 62 upon a plate 63, in turn secured to a flat upon the axle housing. A stationary toothed quadrant 64 is rigidly secured to this stationary plate and is engaged by a latch, carried by the lever. When the upper end of the lever is moved forwardly, its lower end is moved rearwardly and the device 50 is turned to raise the boom. A belt guide 66 is mounted upon the boom near the vertical pulley 47 and embodies upper and lower rollers 67 and 68. A retractile coil spring 69 is connected with the outer upright 53a and with the rear axle housing by means of suitable attachment and also tends to swing the device 50 for raising the boom.

I provide a pusher device for coaction with the saw. This pusher device includes a horizontal guide rail 70, rigidly attached to the steering pedestal 71 and a diagonal brace 72 is connected with the guide rail 70. The pusher device comprises a transverse horizontal pusher head 73, preferably in the form of a stiff metal plate. This pusher head may be a T-iron and is rigidly secured to the forward end of a pipe or rod 74 by bolts 75 (Fig. 1) or the like. Diagonal bars 76 also preferably connect these parts. The pipe 74 rests upon the guide rail 70 and is slidably mounted within a U-shaped guide 77, rigidly attached to the rail 70. At its rear end, the pipe 74 is slidably mounted in a sleeve 78, having apertured knuckles 79 rigidly secured thereto and these knuckles are pivotally mounted upon the upper end of the arm 19, as shown at 80. See Fig. 6. The arm 19 has a toothed quadrant 81 rigidly secured thereto and a lever 82 is pivoted upon this quadrant, as shown at 83. Above the pivot 83, the lever 82 has a rigid rod or link 84 pivotally connected therewith and this rod passes through an apertured knuckle 85, rigidly secured to the pipe 74 and is adjustably secured to the apertured knuckle by means of collars 86, clamped thereon by set screws.

The operation of the machine is as follows:

In sawing smaller trees which may be bent by the force of the tractor, the tractor is driven toward the tree until the saw 46 slightly contacts with the tree. The arm 19 of the hydraulic lift is now in the forward raised position and is positively held in this position until the pedal 77' is depressed. The pusher head 73 now engages the tree or if it does not engage the tree, the lever 82 is swung forwardly to bring the pusher head 73 in engagement with the tree. The lever 82 is now locked in the forward adjusted position. The tractor engine is ordinarily driven at about 975 R. P. M. and this speed is usually maintained constant regardless of the manipulation of the transmission gearing. The saw 46 being directly driven by the crank shaft of the engine is maintained at a constant speed. It is preferred that the constant speed of the saw be 1000 R. P. M.'s for a 40 inch saw but this speed will vary somewhat depending upon the diameter of the saw. As the saw rotates in engagement with the tree the cutting occurs and the tractor is advanced slowly toward the tree, thus feeding the saw forwardly. In the case of a smaller tree, the pusher bar 73 would bend the tree away from the saw thus permitting of the forward movement of the tractor and the feeding of the saw. Before the saw completely severed the tree the pusher head would have felled the tree. In the event that the tree is so large that it cannot be bent by the force of the tractor, when the tractor moves toward the tree, the operator depresses the pedal 77'. This will permit the arm 19 of the hydraulic lift moving rearwardly. This arm would move rearwardly for about 8 inches and will then reach the end of its travel. By adjusting the screw which controls the flow of the fluid within the hydraulic lift, the fluid will produce a yielding resistance to the rearward movement of the arm 19 when the pedal 77' is depressed. This will enable the presser head 73 to exert a suitable constant pressure upon the tree during the forward movement of the tractor. By the time the arm 19 has reached the end of its rearward travel, the saw will have cut the tree sufficiently whereby the pusher bar can bend the tree forwardly. By again depressing the pedal 77' while the arm 19 is in the rear position, this arm will move forwardly, provided that the power take-off from the transmission is being operated by the engine and the arm 19 will then force the pipe 74 forwardly and the pusher head 73 will complete the felling of the tree without the further cutting action of the saw.

In Figures 8 to 10 inclusive I have shown a modified form of saw carrying boom, whereby the saw can be operated in horizontal and vertical positions. In these figures the numeral 87 designates a tubular boom or arm, the rear end of which is rotatably mounted in a sleeve 88, rigidly mounted upon a transverse sleeve 89, corresponding to the sleeve 44' and pivotally supported upon the frame. The sleeve 88 and boom 87 have openings 90 spaced for 90° for receiving bolts 91. The boom 87 may be turned to selected positions for 90° apart and then locked in the selected adjusted position. The same sleeve 44 is employed but is offset laterally with respect to the boom 87 and is equipped at its top with a lateral coupling 91 rigidly secured to the boom 87. The diagonal brace 45 connects the sleeve 44 and the boom 87. The rotary saw 46 is carried by the mandrel 45' in the sleeve 44 and driven by the pulley 47, engaged by the belt 48.

The saw 46 is positioned suitably in advance of the wheels 12 so that it will not engage the same. The saw 46 may be horizontally arranged, Figure 9, and will then be driven as described in connection with the first form of the invention. The boom 87 is raised and lowered in the same manner as the boom 42. When it is desired to use the saw 46 in a vertical position the bolts 91 are manipulated and the sleeve 44 swung to the left, Figure 9, for 90°, thereby bringing the sleeve 44 to the horizontal position and vertically arranging the saw 46. Due to the offset coupling 91 the pulley 47 is in alignment with the pulley 49. After this adjustment the boom 87 is locked in the selected adjusted position by manipulation of the bolts 91. All other parts of the apparatus remain identical with those shown and described in connection with the first form of the invention.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. A tractor including a hydraulic lift embodying a swinging arm to move longitudinally of the tractor, a support mounted upon the tractor, a pusher device extending longitudinally of the tractor and mounted upon the support and extending forwardly beyond the tractor, a sleeve slidably receiving the rear end of the pusher device and pivotally connected with the swinging arm, a lever pivotally mounted upon the swinging arm, a link connecting the lever and pusher device, and means to lock the lever in the selected adjusted position.

2. An attachment to be mounted upon a tractor having a chassis including a side rail and an engine having a transverse shaft and side pulley mounted upon the transverse shaft, said attachment comprising forward and rear brackets extending outwardly beyond the side rail, each bracket including an inner vertical side member and a diagonal outer side member, means to attach each vertical side member to the rail, a horizontal pivot element for each bracket having its inner end secured to the vertical side member and its outer end secured to the diagonal side member, a generally horizontal bar attached to the outer ends of the horizontal pivot elements and having its rear end connected with the axle housing of the tractor, a sleeve pivotally mounted upon the pivot element of the rear bracket, a boom extending longitudinally of the side rail next to the pulley and projecting forwardly beyond the same and connected with the sleeve, a second sleeve pivotally mounted upon the pivot element of the forward bracket, a generally horizontal swingable arm remote from the first sleeve and rigidly mounted upon the second sleeve, a roller carried by the arm and arranged beneath the boom to engage with the boom and raise it, a generally vertical mandrel mounted upon the forward end of the boom, a generally horizontal saw mounted upon the mandrel, a pulley mounted upon the mandrel, and a belt engaging the pulley of the mandrel and the pulley of the engine.

3. An attachment to be mounted upon a tractor having a chassis including a side rail and an engine having a transverse shaft and a side pulley mounted upon the transverse shaft, said attachment comprising forward and rear brackets disposed outwardly of the side rail next to the pulley and extending below the side rail, each bracket including an inner vertical side member and a diagonal side member having an apertured knuckle at its upper end, means to attach the upper end of each vertical side member to the rail, a horizontal tubular pivot element for each bracket having its inner end secured to the vertical side member, a pin extending into the outer end of each tubular pivot element and secured therein and extending through the apertured knuckle of the diagonal side member, a forward generally horizontal bar provided at its ends with apertures to receive the pins, a rear generally horizontal bar provided at its forward end with an aperture to receive the rear pin and having its rear end connected with the axle housing of the tractor, a rear sleeve pivotally mounted upon the rear tubular pivot element, a boom extending longitudinally of the side rail next to the brackets and secured to the rear sleeve, a forward sleeve pivotally mounted upon the forward tubular pivot element, a generally horizontal swingable arm remote from the rear sleeve and rigidly mounted upon the forward sleeve, a roller carried by said arm and arranged beneath the boom to engage with the boom and raise it, means to swing the arm, a generally vertical mandrel mounted upon the forward end of the boom, a generally horizontal saw mounted upon the mandrel, a pulley secured to the mandrel, and a belt engaging the pulley of the mandrel and the pulley of the engine.

4. A tractor including a chassis, a steering pedestal near its forward end, an engine having a transverse shaft and a side pulley mounted upon the transverse shaft, a hydraulic lift near the rear end of the tractor, the hydraulic lift including an upstanding arm arranged near the side of the chassis next to the pulley and adapted to swing within limits longitudinally of the chassis and means for controlling the swinging movement of the upstanding arm, a generally horizontal support attached to the steering pedestal and projecting laterally beyond the side of the chassis next to the pulley, a pusher device extending longitudinally of the side of the chassis next to the pulley and carried by the support, manually adjustable means connecting the rear end of the pusher device with the arm so that the pusher device may be moved longitudinally with relation to the arm and also move with the arm, a supporting structure arranged beneath the pusher device and attached to the chassis and extending laterally beyond the side of the chassis next to the pulley, a boom pivotally mounted upon the supporting structure to swing vertically, means to raise and lower the boom, a generally vertical mandrel carried by the boom, a horizontal saw carried by the mandrel, a pulley mounted upon the mandrel, and a belt engaging the pulley of the mandrel and the pulley of the engine.

JAMES R. CRAWFORD.

REFERENCES CITED

The following references are of record in the file of this patent:

UNITED STATES PATENTS

| Number | Name | Date |
| --- | --- | --- |
| 638,553 | Burke | Dec. 5, 1899 |
| 827,548 | Martin | July 31, 1906 |
| 1,039,338 | Wallace | Sept. 24, 1912 |
| 1,318,324 | Keon | Oct. 7, 1919 |
| 1,414,319 | Zaiauskis | Apr. 25, 1922 |
| 1,602,357 | Georgelis | Oct. 5, 1926 |
| 2,050,952 | Jaques | Aug. 11, 1936 |
| 2,216,971 | Farmer | Oct. 8, 1940 |
| 2,274,902 | Knight | Mar. 3, 1942 |
| 2,350,880 | Dellinger et al. | June 6, 1944 |
| 2,353,873 | Brownlee | July 18, 1944 |
| 2,354,625 | Van Sickle | July 25, 1944 |

FOREIGN PATENTS

| Number | Country | Date |
| --- | --- | --- |
| 27,542 | Sweden | Oct. 16, 1909 |
| 113,879 | Australia | Sept. 16, 1941 |
| 117,455 | Australia | Aug. 31, 1943 |